March 31, 1959  M. D. ROGERS ET AL  2,880,314
DIFFERENCE MODULATOR
Filed Nov. 16, 1953  2 Sheets-Sheet 1

INVENTORS
MONROE M. DICKINSON JR.
MORTIMER D. ROGERS
BY

INVENTORS
MONROE M. DICKINSON JR.
MORTIMER D. ROGERS
BY P. E. Henninger

United States Patent Office 2,880,314
Patented Mar. 31, 1959

2,880,314

DIFFERENCE MODULATOR

Mortimer D. Rogers, Vestal, and Monroe M. Dickinson, Jr., Endicott, N.Y., assignors to International Business Machines Corporation, New York, N.Y., a corporation of New York Application November 16, 1953, Serial No. 392,082

3 Claims. (Cl. 250—27)

This invention relates to triangle solving apparatus and especially to electrical apparatus for determining the length of the hypotenuse of a right triangle from the lengths of its two sides. An important feature of the invention is an improved motor control system comprising a novel modulator circuit. While the new modulator circuit and motor control system are of particular utility in connection with triangle solving apparatus, as described in detail herein, these novel features also have a broader utility in connection with modulator circuits and motor control systems generally.

It is desirable to determine the length of the hypotenuse of a right traingle in many navigation and position determining systems. For example, such a determination is necessary to find the linear distance (slant range) between the ground observer and an aerial target, where the horizontal range and the elevation of the target are known. In one type of position determining system, information regarding the horizontal range and elevation of the target are available as alternating electrical signal potentials. Both of these signals are derived from the same alternating power source by similar translating devices, for example optical devices or radar systems, and are commonly of the same phase. It has been proposed to compute the hypotenuse length (slant range) from such signals by shifting the phase of one signal by 90 electrical degrees and adding it to the other vectorially to give a signal proportional to the hypotenuse length In many systems of the type described, it is required to establish the position of a mechanical element, for example a shaft driving an indicator pointer, as a function of this hypotenuse length. This is commonly done by producing an electrical signal varying with the shaft position and comparing it with the hypotenuse length signal. The difference between these two signals is utilized to control a motor which drives the shaft and changes its position until the two signals balance, whereupon the motor stops. The shaft position is then an accurate indication of the hypotenuse length.

Certain currently popular types of motor control systems for positioning a shaft in accordance with a varying signal utilize alternating current motors having one winding which is continuously energized at a fixed potential and a second winding which may be energized with alternating current of varying phase and potential. Such a motor may be of the split phase type, in which the continously energized winding is supplied with current of a fixed phase, while the variably energized winding is supplied with current which either leads or lags the current in the fixed phase by 90 electrical degrees. Selection of the lead or lag in the variably energized phase determines the direction of rotation of the motor. In a motor control system of this type, the variably energized winding may be controlled by means of a modulator circuit which compares two unidirectional signal potentials and produces an alternating signal potential proportional to the difference of the two unidirectional potentials.

Such a modulator circuit involves a comparison of two unidirectional potentials whose difference becomes very small, especially when the system is near the point of balance. To secure sensitivity, the circuit and its associated motor control system must be made responsive to very small potentials. Where systems of the prior art have been made so sensitive, difficulties have been encountered due to stray electromagnetic fields which introduce transient or even steady potentials in the circuit. Such potentials may appear as components of the output potential and cause errors in the indicator position.

An object of the present invention is to provide an improved triangle solving apparatus of the type described including means for producing an alternating signal potential proportional to a hypotenuse length, means for rectifying that potential, and a motor control system for positioning an indicator in accordance with the rectified signal.

A further object is to provide a motor control system of the type described, including improved means for suppressing errors due to stray electromagnetic fields.

A further object is to provide an improved modulator circuit including means for suppressing the effects of stray induced currents.

The foregoing and other objects of the invention are attained, in the apparatus described herein, by providing triangle solving apparatus including devices for transmitting alternating signal potentials respectively proportioned to ground range and elevation quantities. These two signals are combined in a phase shifter and adder network of conventional type, thereby producing an alternating signal proportional to the vector sum of the ground range and elevation signals. This latter signal is demodulated in a peaklinear demodulator circuit to produce a unidirectional signal proportional to the hypotenuse or slant range.

This latter hypotenuse length signal is transmitted as an input signal to a difference modulator circuit which compares it with another input signal varying with an indicator position. The difference modulator produces an alternating output signal which is a measure of the difference between the two input signals. This output signal is amplified and transmitted to a variably energized winding of a motor which drives both the indicator pointer and mechanism which determines the magnitude of the indicator position signal.

The modulator circuit includes two triodes, which are acting in opposition with respect to the output signal of the modulator. The hypotenuse length signal is applied to the control electrode of one triode, while the indicator position signal is supplied to the control electrode of the other. The two control electrodes are connected through a condenser. Any stray alternating potential reaching either control electrode is transmitted through this condenser to the other, so that such stray potentials affect both triodes equally. Since the outputs of the two triodes are acting in opposition, such stray electrical potentials can produce no effect on the output signal.

Other objects and advantages of our invention will become apparent from a consideration of the following specification and claims, taken together with the accompanying drawing.

Figure 1:
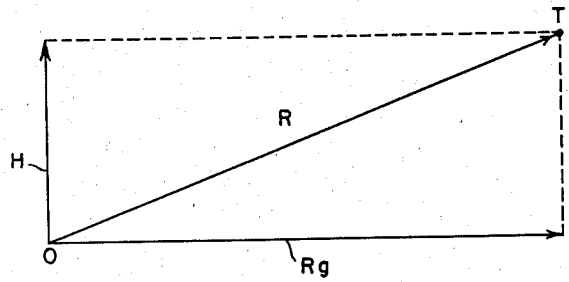
Fig. 1 is a vector diagram, illustrating the addition of two vector quantities to form a vector sum, in a particular type of problem solved by apparatus constructed in accordance with the invention.

Referring to Fig. 1, there is shown a horizontal vector Rg representing the horizontal distance between an observer and an aerial target T. The vertical vector H represents the elevation of the target T above O. Rg and H are added vectorially to produce a slant range vector R. It may be seen that the slant range vector R is the hypotenuse of a right triangle having the other two vectors as its sides.

Figure 2:
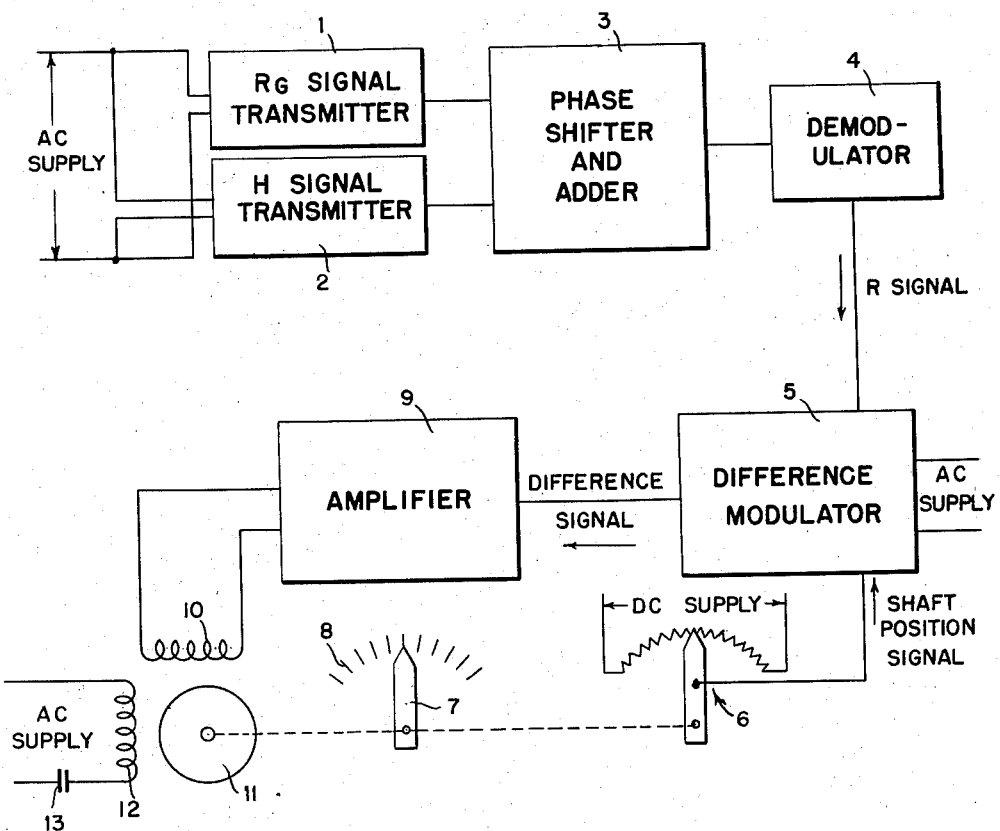
Fig. 2 is a block diagram, illustrating triangle solving apparatus constructed in accordance with the invention.

Referring now to Fig. 2, the system there shown is provided for use with a suitable alternating power supply. Current from this supply source is transmitted to an Rg signal transmitter 1, and an H signal transmitter 2. These two transmitters send their respective signals to a phase shifter and adder circuit, generally indicated at 3, from which a resultant hypotenuse length signal passes to a demodulator 4 and then to a difference modulator 5. The difference modulator 5 also receives a signal from a device 6, which latter signal is proportional to the angular position of an indicator pointer 7 with respect to a scale 8. The difference modulator 5 produces a difference signal which is alternating in character and dependent upon the difference between the two input signals. The difference signal is transmitted to an amplifier 9 and thence to a winding 10 of a motor 11 which drives the pointer 7 and the signal transmitting mechanism 6. The motor 11 also has a winding 12 which is continuously energized from the alternating power supply through a circuit including a condenser 13.

Figure 3:
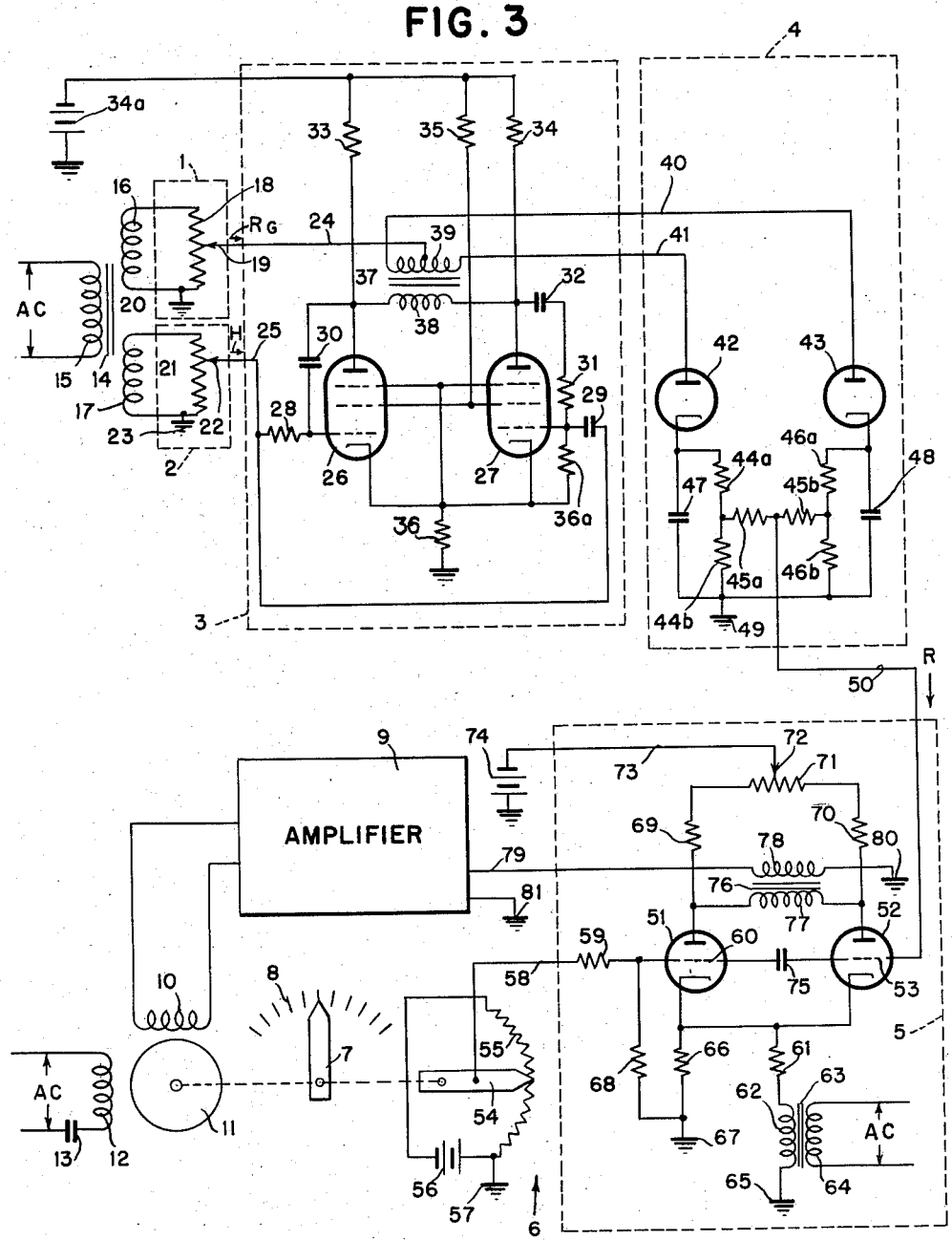
Fig. 3 is a detailed wiring diagram of the system of Fig. 2.

Fig. 3 shows in detail a wiring diagram of the apparatus of Fig. 2, for a computing voltage frequency of 400 cycles per second. Thus circuit elements which are shown diagrammatically in boxes in Fig. 2 are shown in dotted line boxes in Fig. 3. The boxes and other elements which correspond exactly in the two figures have been given the same reference numerals.

In Fig. 3, there is shown a transformer 14 having a primary winding 15 connected to the alternating current source and two secondary windings 16 and 17. The secondary windings 16 and 17, respectively, supply energy to the signal transmitters 1 and 2.

The particular structure employed in the signal transmitters 1 and 2 forms no part of the present invention. Any suitable apparatus may be used which will produce an alternating signal varying in value with a linear distance, or any other quantity which may be added vectorially. In order to simplify the present disclosure, the transmitter 1 is illustrated as a simple resistance 18 having a contact 19 slidable along it. One terminal of the resistance 18 is grounded, as at 20. In a similar fashion the transmitter 2 is shown as comprising a simple resistance 21 having a sliding contact 22 and having one terminal grounded at 23.

The signals from the transmitters 1 and 2 pass through conductors 24 and 25, respectively, to the phase shifter and adder circuit 3. The latter circuit includes a pair of electric discharge devices 26 and 27, illustrated as pentodes.

The shifter and adder circuit 3 is of conventional construction and will be only briefly described herein. The signal from transmitter 2, which reaches the phase shifter and adder circuit on the conductor 25 is transmitted to the control grid of pentode 26 through a resistance 28 and is transmitted to the control grid of pentode 27 through a condenser 29. The pentode 26 is provided with a feedback coupling condenser 30, while the pentode 27 is provided with a feedback coupling resistance 31 having a blocking condenser 32 connected in series with it. Conventional load resistances 33 and 34 are provided. The other grids of the pentodes are connected in one instance to the cathodes and in the other instance to the positive terminal of the plate potential supply battery 34a through a protective resistance 35. A self-biasing resistance 36 is provided in the output circuits of both pentodes. A grid leak resistance 36a is provided for the grid of pentode 27.

An output transformer 37 has a primary winding 38 connected between the output circuits of the pentodes 26 and 27, and a secondary winding 39.

The phase shifter circuit is effective to produce in the primary winding 38 a potential equal in magnitude to the input signal potential received on conductor 25, but shifted substantially 90 degrees in phase from that input signal. The input signal from transmitter 1 is added to the signal in winding 38 by connecting conductor 24 to the mid-point of secondary winding 39. It may be shown that the potential appearing between the terminals of secondary winding 39 is then the vector sum of the two signal potentials received from the transmitters 1 and 2. This vector sum potential is then transmitted through conductors 40 and 41 to the demodulator 4.

The demodulator 4 includes two diodes 42 and 43 having their cathodes connected to a peak-linear network including resistances 44 (44a and 44b) 45 (45a and 45b) and 46 (46a and 46b) and condensers 47 and 48. This network is grounded at 49.

The alternating signal appearing between conductors 40 and 41 is transmitted through the diodes 42 and 43 in alternate half waves, i.e. half-waves of one polarity are transmitted through one diode, and alternate half-waves of the opposite polarity, are transmitted through the others. Each half wave tends to charge one of the condensers 47 and 48 substantially to the peak potential of the half wave. The charges leak off the condensers 47 and 48 through the resistances 44, 45 and 46. Since the peak values of the alternating signals received through conductors 40 and 41 change relatively slowly, this network produces a substantial linear relationship between the potential at the mid point of resistance 45 and the peak value of the incoming signal. This relationship is independent of any non-linearity introduced by the characteristics of diodes 42 and 43. The potential at the mid-point of resistance 45 may be taken as a unidirectional signal representing the length of the hypotenuse which is to be measured. This potential is transmitted through a conductor 50 to the difference modulator 5.

The difference modulator 5 includes two triodes 51 and 52. The signal from conductor 50 is transmitted to the control electrode 53 of triode 52. The modulator 5 also receives an input signal indicative of the position of pointer 7 with respect to scale 8. The particular mechanism for producing this latter input signal forms no part of the present invention. It is illustrated, by way of example, as a simple slider 54 operating over a resistance 55. A battery 56 has its terminals connected across the resistance 55. One terminal of the resistance 55 is grounded at 57. The slider 54 is connected through a conductor 58 and a resistance 59 to the control electrode 60 of the triode 51.

The cathode circuits of the triodes 51 and 52 have a common portion, connected to both cathodes and including two parallel branches. One of these branches includes in series a resistance 61 and the secondary winding 62 of a transformer 63 whose primary winding 64 is connected to the alternating current supply. This branch is grounded at 65. The other parallel branch consists simply of a resistance 66, grounded at 67. A grid leak resistance 68 is connected between the control electrode of triode 51 and ground 67.

The anode circuits of the respective triodes 51 and 52 include load resistances 69 and 70 and the respectively adjacent portions of a voltage divider resistance 71 whose movable contact 72 is connected through a connector 73 to one terminal of a battery 74 which supplies the anode or plate voltage for the triodes 51 and 52.

The control electrodes 60 and 53 are connected through a condenser 75. An output signal transformer 76 has its primary winding 77 connected in a branch circuit between the output circuits of the two triodes 51 and 52, on the electrically opposite sides of those triodes from their common output circuit portion. The transformer 76 has a secondary winding 78.

The transformer 63 serves as a carrier current supply for the triodes 51 and 52. Consequently, the currents flowing through the triodes have substantial alternating components whose frequency is determined by the frequency of the source connected to transformer 63. The amplitudes of these respective components are determined for each triode by the amplitude of the unidirectional signal potential impressed on its control electrode. When these two signal potentials are equal both triodes transmit equal alternating components and no current flows through the primary winding 77. When one of the two triodes conducts more current than the other, then an alternating signal is impressed on primary winding 77. The magnitude of this signal is dependent upon the difference between the magnitude of the two unidirectional signals applied to the control electrodes 53 and 60. The phase of this signal depends upon which triode conducts the more current, or in other words upon the particular identity of the greater of the two unidirectional signals.

An amplifier of this type, which is required to be sensitive to small changes in unidirectional input signals, is subject to disturbances because of stray electromagnetic fields. In the novel circuit disclosed herein, such disturbances are eliminated by the condenser 75 which connects the control electrodes 60 and 53. The troublesome stray potentials are usually of relatively high frequency and are readily transmitted through the condenser 75 so that they affect both the control electrodes equally. Consequently, their effects in both output circuits are the same and they can produce no effect in the output transformer 76. Consequently, they produce no error in the difference signal potential appearing in the secondary winding 78 of that transformer.

This difference signal potential is transmitted through conductors 78, 79 and ground connections 80 and 81 to the amplifier 9 which may be of any suitable conventional construction. The output of amplifier 9 is connected to winding 10 of motor 11, where it controls that motor to drive the slider 54 in a direction to change the input signal to zero and thereby stop the motor.

When the difference signal is zero the position of slider 54 along resistance 55 is a measure of the hypotenuse length signal transmitted through conductor 50. The position of indicator 7 relative to scale 8 would therefore similarly be a measure of that signal. If the scale 8 is properly calibrated, the value of the hypotenuse being calculated can be read from the scale 8 at the pointer position.

In order to facilitate the construction of triangle solving apparatus in accordance with our invention, we submit below a list of various circuit components identified above, with indications of the values and other identifying data of the elements used for such components in one particular system which has been constructed and operated successfully.

| Component | Value |
|---|---|
| Discharge devices 26, 27 | 2 Type 5840 pentodes. |
| Discharge devices 42, 43 | 1 Type 5896 twin diode. |
| Discharge devices 51, 52 | 1 Type 6111 twin triode. |
| Transformer 37 | 2.5/1 ratio. |
| Transformer 63 | |
| Transformer 76 | |
| Resistance 28 | 1.1 megohm. |
| Resistance 31 | 1.1M. |
| Resistance 33 | 13K. |
| Resistance 34 | 13K. |
| Resistance 35 | 20K. |
| Resistance 36 | 270 ohms. |
| Resistance 36a | 1.1M. |
| Resistance 44a | 1.1M. |
| Resistance 44b | 470K. |
| Resistance 45a | 470K. |
| Resistance 45b | 470K. |
| Resistance 46a | 1.1M. |
| Resistance 46b | 470K. |
| Resistance 59 | 1.1M. |
| Resistance 61 | 9.1K. |
| Resistance 66 | 1.1K. |
| Resistance 68 | 470K. |
| Resistance 69 | 5.1K. |
| Resistance 70 | 5.1K. |
| Resistance 71 | 1000 ohms. |
| Condenser 29 | 100-500 pfd. |
| Condenser 30 | 100-500 pfd. |
| Condenser 32 | .10 mfd. 400 v. D.C. paper. |
| Condenser 47 | .05 mfd. |
| Condenser 48 | .05 mfd. |
| Condenser 75 | .10 mfd. |

While we have shown and described a preferred embodiment of our invention, other modifications thereof will readily occur to those skilled in the art and we therefore intend our invention to be limited only by the appended claims.

We claim:
1. A modulator circuit for producing an alternating electrical signal potential varying in accordance with the difference of two unidirectional signal potentials, comprising two electric discharge devices, each having an anode, a cathode, and a control electrode, two output circuits, one for each said device, said output circuits having a common portion including means for introducing an alternating carrier potential therein, a branch circuit connecting said output circuits at localities on the opposite sides of said discharge devices from said common portion, means for transmitting said two unidirectional signal potentials respectively to said control electrodes, said devices being effective to produce in said branch circuit an alternating electrical difference signal potential varying in accordance with the difference of said two potentials, and means including a condenser connecting said control electrodes and effective to transmit any stray alternating potential reaching either control electrode to the other, so that said stray potentials have equal effects in said output circuits and no effect in said branch circuit.

2. A modulator circuit for producing an alternating electrical signal potential varying in accordance with the difference of two unidirectional signal potentials, comprising two electric discharge devices, each having an anode, a cathode, and a control electrode, two output circuits, one for each said device, said output circuits having a common portion including means for introducing an alternating carrier potential therein, a branch circuit including an impedance and connecting said output circuits at localities on the opposite sides of said discharge devices from said common portion, means for transmitting said two unidirectional signal potentials respectively to said control electrodes, said devices being effective to produce across said impedance in said branch circuit an alternating electrical difference signal potential varying in magnitude in accordance with the magnitude of the difference of said two potentials and in phase in accordance with the larger of the two potentials, and means including a condenser connecting said control electrodes and effective to transmit any stray alternating potential reaching either control electrode to the other, so that said stray potentials have equal effects in said output circuits and no effect in said branch circuit.

3. A modulator circuit for producing an output signal potential varying in accordance with the difference of two unidirectional input signal potentials, comprising two electric discharge devices, each having an anode, a cathode, and a control electrode, two output circuits, one for each said device, said output circuits having a common portion, a branch circuit connecting said output circuits at localities on the electrically opposite sides of said discharge devices from said common portion, means for transmitting said two input signal potentials respectively to said control electrodes, said devices being effective to produce in said branch circuit an output signal potential varying in accordance with the difference of said two input signal potentials, and means including a condenser connecting said control electrodes and effective to transmit any stray alternating potential reaching either control electrode to the other, so that said stray potentials have equal effects in said output circuits and no effect in said branch circuit.

References Cited in the file of this patent

UNITED STATES PATENTS

| | | |
|---|---|---|
| 2,426,658 | Wooldridge | Sept. 2, 1947 |
| 2,465,624 | Agins | Mar. 29, 1949 |
| 2,530,642 | Yardeny | Nov. 21, 1950 |
| 2,583,552 | Edwards | Jan. 29, 1952 |
| 2,600,264 | Proctor | June 10, 1952 |
| 2,610,789 | Hales | Sept. 16, 1952 |
| 2,617,588 | Dobbins | Nov. 11, 1952 |
| 2,640,954 | Sherwin | June 2, 1953 |
| 2,694,143 | Chambers | Nov. 9, 1954 |
| 2,697,808 | MacNichol | Dec. 21, 1954 |